United States Patent

[11] 3,540,353

[72] Inventors Jean Langlet,
Neuilly sur Seine;
Joseph Gustave Etienne Andre, Toulouse,
France
[21] Appl. No. 801,135
[22] Filed Feb. 20, 1969
Original application April 4, 1966, Ser. No.
539,780, now Patent No. 3,442,005
[45] Patented Nov. 17, 1970
[73] Assignee Callisto, La Garenne, France and Sud-Aviation,
Paris, France,
French Companies
[32] Priority April 3, 1965
[33] France
[31] No. 11,854

[54] BELLOWS BONDED AT INNER PERIPHERAL EDGES
4 Claims, 3 Drawing Figs.
[52] U.S. Cl. .................................................... 92/34
[51] Int. Cl. .................................................... F16j 3/00
[50] Field of Search ............................................ 92/34, 45,
103M; 103/148; 73/410, 262; 74/18, 18.1, 18.2;
137/510; 29/454; 251/61, 335.2

[56] References Cited
UNITED STATES PATENTS

| | | | |
|---|---|---|---|
| 1,106,341 | 8/1914 | Bristol ........................ | 73/410 |
| 1,217,344 | 2/1917 | Powers ....................... | 92/45 |
| 1,570,861 | 1/1926 | Quiroz ........................ | 103/148 |
| 2,444,008 | 6/1948 | Fentress ..................... | 92/45 |
| 2,657,074 | 10/1953 | Schwester et al. .......... | 92/34 |
| 3,096,104 | 7/1963 | Browning .................... | 92/45 |
| 3,422,680 | 1/1969 | Nolte ......................... | 92/34 |

*Primary Examiner*—Martin P. Schwadron
*Assistant Examiner*—Leslie J. Payne
*Attorney*—Michael S. Striker

ABSTRACT: A bellows in which a plurality of thin-walled annular members of substantially U-shaped cross section are arranged axially aligned with each other in abutting relationship and bonded to each other at the inner peripheral edges thereof.

Patented Nov. 17, 1970

3,540,353

INVENTORS:
JEAN LANGLET
JOSEPH GUSTAVE ETIENNE ANDRÉ

By Michael S. Stoika
Attorney

3,540,353

BELLOWS BONDED AT INNER PERIPHERAL EDGES

CROSS REFERENCES TO RELATED APPLICATIONS

The present application is a divisional application of the copending application filed Apr. 4, 1966 under the Ser. No. 539,780, now U.S. Pat. No. 3,442,005.

The present invention relates to bellows, and more particularly to a bellows composed of a plurality of identical annular parts bonded together in a novel manner to withstand high temperatures and a high pressure.

Two basic types of bellows are known in the art.

One type of bellows is known in which a thin-walled tube is corrugated by a hydraulic process into a bellows. The alloys from which the thin walled tubes are formed which are subsequently transformed into a bellows necessarily have to have a ductility and stretchability sufficient to sustain the considerable cold deformation of the tube into a bellows while maintaining after the formation acceptable mechanical characteristics.

Therefore, only certain alloys such as tombac, Monel or stainless steel may be used for this purpose and none of these alloys is structurally hardenable by heat treatment. Therefore the bellows produced from these alloys are not adapted to resist at the same time high temperatures, a high pressure while being subjected to a corrosive atmosphere so as to operate trouble-free for a considerable time under adverse operating conditions. In addition, these bellows usually have a stroke less than 20 percent of their free length and this stroke is preferably performed by contraction of the bellows.

The second basic type of known bellows comprises a plurality of annular disks welded at the inner and outer peripheral edges to each other. A great number of metal alloys can be used for manufacturing a bellows of this type and especially alloys which can be structurally hardened by heat treatment may be used. The bellows of the second type will therefore have mechanical characteristics improved over the bellows of the first mentioned type and the performance of the bellows of the second type will be superior in many respects with regard to the bellows of the first type. Nevertheless, the welded portions of the second type of bellows represent zones of fragility.

For certain applications it is not necessary that the bellows can expand to a considerable extent in longitudinal direction or that they are flexible to a considerable extent in a direction transverse to their axes, but it is necessary that these bellows operate under severe operating conditions, that is at high temperature, for example, at a temperature of 650°C. and that they have to withstand high pressures such as for instance 20 kg. per cm². In addition, the bellows in such applications may be subjected to strong internal turbulences and vibrations. The known bellows of the two constructions above mentioned will go out of service under such operating conditions in a short time either due to rupture of the thin metal wall of the first mentioned type of bellows or due to bursting of the bellows of the second type at the welded edges thereof.

Various attempts have been made to overcome the shortcomings of the two types of bellows mentioned above, but the constructions known in the art to improve these bellows have not worked out satisfactorily in practice.

It is an object of the present invention to provide for a bellows which avoids the shortcomings of the bellows known in the art mentioned before.

It is an additional object of the present invention to provide for a bellows which is composed of a plurality of elements aligned along a common axis, bonded together, and constructed and arranged in such a manner so as to withstand high pressure especially internal pressure without bursting.

SUMMARY OF THE INVENTION

With these objects in view, the bellows according to the present invention mainly comprises a plurality of superimposed thin walled elements having surfaces of revolution and being aligned along a common axis with each other, each of the elements having in an axial cross section a substantially U-shaped configuration with the concave side of said U-shaped cross section facing the common axis, wherein adjacent elements abut against each other and being bonded to each other along the inner peripheral edges thereof. The plurality of elements above mentioned is preferably formed from sheet metal and the elements are bonded to each other preferably by welding along the inner peripheral edges thereof.

Preferably, the U-shaped cross section comprises a semicircular portion and a pair of substantially parallel leg portions tangential to said semicircular portion and projecting therefrom toward the axis of the bellows.

In such a construction, high internal pressure will not lead to destruction of the bond between adjacent elements since the higher the internal pressure will be the higher will be the pressure at which the portions of adjacent elements which abut against each other are pressed against each other.

A bellows of the aforementioned kind can be manufactured from a great variety of alloys, especially from alloys which may be hardened by heat treating.

The bellows according to the present invention has a great number of advantages over the bellows according to the above discussed prior art. The bellows according to the present invention may be manufactured from the plurality of superimposed toric shells in a very efficient manner and therefore at reasonable cost. The bellows according to the present invention will have a movability in longitudinal and transverse direction which closely approaches that of the bellows of the first mentioned kind. The shape of the bellows according to the present invention is especially adapted for the provision of internal or external guide means and means to prevent turbulence in the exterior of the bellows or vibration thereof. In addition, the bellows according to the present invention has a remarkable resistance against high internal pressures even if applied under additional especially severe conditions such as temperatures higher than 650°C. or maintenance of the bellows in a strongly corrosive atmosphere. Experience has shown that the bellows according to the present invention will withstand such severe operating conditions in a perfect manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
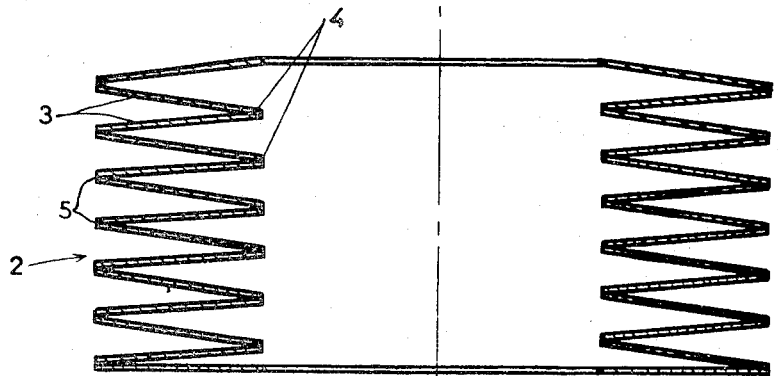
FIGS. 1 and 2 are axial cross sections through bellows according to the prior art.
Figure 1:
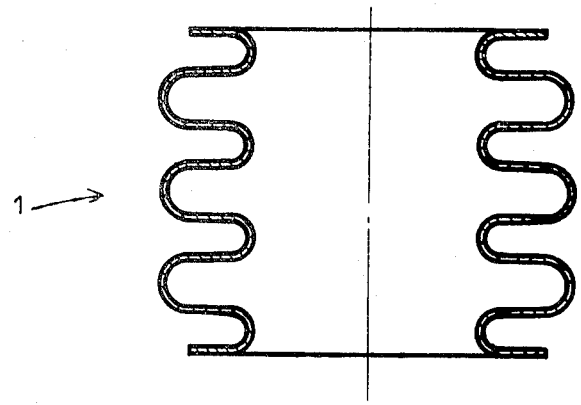

The bellows 1 shown in FIG. 1 is a bellows according to the prior art in which a thin walled tube is corrugated in a manner known to form the bellows 1 illustrated in FIG. 1 therefrom. FIG. 2 likewise illustrates a bellows according to the prior art and the bellows 2 shown in FIG. 2 is composed of a plurality of substantially frustoconical disks 3 which are welded at the inner and outer peripheral edges 4 and 5 to each other. Internal pressure in the bellows 2 will tend to spread the radially outwardly extending portions of adjacent disks apart so that rupture along the outer edges 5 may easily occur.

Figure 3:
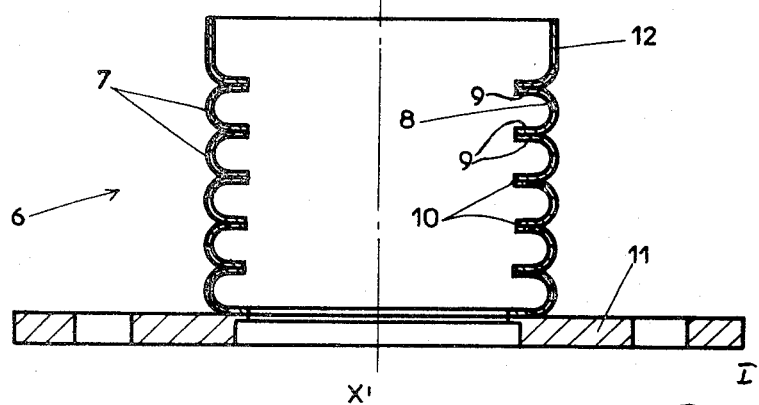
FIG. 3 is an axial cross section through a bellows according to the present invention.

FIG. 3 illustrates an axial cross section through a bellows according to the present invention. As can be seen from FIG. 3 the bellows according to the present invention comprises a plurality of elements or shells 7 wherein each of the shells 7 has a surface of revolution about the axis X-X' which in an axial cross section has a substantially U-shaped configuration with the concave side of the U-shaped cross section facing the aforementioned axis. More precisely each U-shaped cross section comprises a semicircular portion 8 and a pair of substantially parallel leg portions 9 tangential to the aforementioned semicircular portion and projecting therefrom substantially normal to the axis X–X' towards the latter. Each shell 7 is therefore substantially in the form of a semitore having a concave side facing the axis thereof and extended tangentially by two flat annular portions.

The shells 7 are preferably made from annular disks stamped out of sheet metal and the annular disks are then bent into the configuration as shown in FIG. 3.

After a plurality of shells 7 is manufactured, for instance in the above-described manner, the shells are superimposed upon each other, aligned along a common axis, with the bottom portion of one shell abutting against the flat top portion of the shell adjacent thereto. Subsequently thereto the abutting portions of the shells are fixedly connected together for instance by autogenous welding in an inert gas atmosphere, for instance in an atmosphere of argon. The weld seams are produced along the inner peripheries 10 of the shells.

In this way a bellows is produced which is adapted to withstand great interior pressure, since in the thus obtained construction an increased pressure in the interior of the bellows will press the leg portions 9 of adjacent shells 7 with increased pressure against each other so that the weld seams 10 at the inner peripheries of the shells 7 will not be affected by the increased pressure of the interior of the shells and evidently the bellows according to the present invention is adapted to withstand a much greater internal pressure than the bellows according to the prior art as shown in FIG. 2 in which an increased interior pressure will tend to press the outer peripheral portions of the frustoconical disks 3 away from each other so that the weld seams at the outer periphery of these disks are liable to burst as the interior pressure in the bellows increases.

To connect the bellows 6 shown in FIG. 3 to another machine element, an end member 11 as shown in FIG. 3 may be attached to the lowermost of the shells 7, for instance by welding the bottom portion of the lowermost shell 7 along the inner periphery thereof to the end member 11. A member 12 having an upper cylindrical portion may be attached in the same manner to the uppermost of the shells 7, as shown in FIG. 3, and the member 12 may serve to attach thereto in any convenient manner, for instance likewise by welding, a connecting member not shown in FIG. 3 thereto.

It will be understood that each of the elements described above, or two or more together, may also find a useful application in other types of bellows differing from the types described above.

While the invention has been illustrated and described as embodied in a bellows formed by a plurality of substantially toric shells welded together, it is not intended to be limited to the details shown, since various modifications and structural changes may be made without departing in any way from the spirit of the present invention.

For instance, if the bellows has to withstand an external pressure the toric shells may be arranged so that the concave sides thereof face away from the axis of the bellows.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A bellows adapted to be subjected to inner operating pressure and comprising a plurality of one piece superimposed thin walled elements defined by surfaces of revolution, said elements being aligned along a common axis, and each of said elements having in axial cross section a substantially U-shaped configuration having a concave side facing said axis, said elements terminating in flat annular portions normal to said axis and having inner peripheral edges, the flat portions of adjacent elements abutting against each other and being bonded to each other and being bonded to each other along said inner peripheral edges, whereby increase of the inner operating pressure of the bellows will lead to an increase of the cohesion of said elements, said bellows composed of said U-shaped elements having a mobility in direction of said axis and transverse thereto.

2. A bellows as set forth in claim 1, wherein said elements are formed from sheet metal and wherein said elements are welded to each other along said inner peripheral edges thereof.

3. A bellows as set forth in claim 2, wherein said elements are formed from hardened sheet metal.

4. A bellows as set forth in claim 2, wherein said U-shaped cross section comprises a semicircular portion and said flat portions forming a pair of substantially parallel leg portions tangential to said semicircular portion and projecting therefrom substantially normal to said axis towards the latter.